United States Patent
Ottaway

(10) Patent No.: US 12,043,337 B2
(45) Date of Patent: Jul. 23, 2024

(54) BICYCLE LIGHT DEVICE

(71) Applicant: Project Flock Pty Ltd, Sydney (AU)

(72) Inventor: Timothy Ottaway, Sydney (AU)

(73) Assignee: Project Flock Pty Ltd, Sydney (AU)

( * ) Notice: Subject to any disclaimer, the term of this patent is extended or adjusted under 35 U.S.C. 154(b) by 0 days.

(21) Appl. No.: 18/036,606

(22) PCT Filed: Nov. 11, 2021

(86) PCT No.: PCT/AU2021/051335
§ 371 (c)(1),
(2) Date: May 11, 2023

(87) PCT Pub. No.: WO2022/099367
PCT Pub. Date: May 19, 2022

(65) Prior Publication Data
US 2023/0406432 A1     Dec. 21, 2023

(30) Foreign Application Priority Data

Nov. 12, 2020   (AU) ................................ 2020904145

(51) Int. Cl.
*B62J 6/26*       (2020.01)
*B62J 6/04*       (2020.01)
*B62J 45/20*      (2020.01)
*B62J 45/414*     (2020.01)

(52) U.S. Cl.
CPC . *B62J 6/26* (2020.02); *B62J 6/04* (2013.01); *B62J 45/20* (2020.02); *B62J 45/414* (2020.02)

(58) Field of Classification Search
CPC ............... B62J 6/26; B62J 6/04; B62J 45/414
See application file for complete search history.

(56) References Cited

U.S. PATENT DOCUMENTS

| 8,770,808 B1 * | 7/2014 | Campbell ................ B62J 11/00 362/800 |
| 2007/0285934 A1 | 12/2007 | Carillo |
| 2009/0010015 A1 * | 1/2009 | Carillo ....................... B62J 6/26 362/473 |
| 2009/0080207 A1 * | 3/2009 | Hurwitz ..................... B62J 6/16 362/474 |

(Continued)

FOREIGN PATENT DOCUMENTS

GB           0952073 A2 *  4/1999

OTHER PUBLICATIONS

International Search Report and Written Opinion in PCT International Application No. PCT/AU2021/051335 mailed Dec. 16, 2021.

(Continued)

*Primary Examiner* — Evan P Dzierzynski
(74) *Attorney, Agent, or Firm* — Cognition IP, P.C.; Edward Steakley

(57) ABSTRACT

A bicycle light device has a body encapsulating direct visibility lighting and leg motion reflective lighting. The lighting is respectively directed so that, when the device is attached to a bicycle in use, the leg motion reflective lighting casts illuminating light downwardly and forwardly with respect to a visible beam directed rearwardly by the direct visibility lighting to enhance leg motion cognitive awareness in other road users.

20 Claims, 5 Drawing Sheets

(56) References Cited

U.S. PATENT DOCUMENTS

| | | | |
|---|---|---|---|
| 2010/0225459 A1* | 9/2010 | Lee | B60Q 1/50 |
| | | | 340/432 |
| 2012/0112635 A1 | 5/2012 | Cho et al. | |
| 2013/0033883 A1 | 2/2013 | Ward et al. | |
| 2015/0197299 A1* | 7/2015 | Lee | B62J 6/04 |
| | | | 280/288.4 |
| 2016/0023703 A1* | 1/2016 | Braggin | B62J 6/26 |
| | | | 362/473 |
| 2017/0106929 A1* | 4/2017 | Deckard | B62J 1/28 |

OTHER PUBLICATIONS

Project Flock—a revolutionary bike light. <URL: https://www.youtube.com/watch?v=nr0m5Fr2ieU> [Published online Sep. 17, 2020].

* cited by examiner

BICYCLE LIGHT DEVICE

CROSS-REFERENCE TO RELATED APPLICATIONS

This application is a 35 U.S.C. § 371 U.S. National Stage application of International Application No. PCT/AU2021/051335, filed on Nov. 11, 2021, which claims the benefit of priority of Australian Application No. 2020904145, filed on Nov. 12, 2020, which are incorporated herein by reference in their entirety.

FIELD OF THE INVENTION

This invention relates generally to bicycle lights and, more particularly, to a bicycle light device which increases cognitive awareness of motion by reflecting light from legs of a rider.

BACKGROUND OF THE INVENTION

Bicycle lighting is illumination attached to bicycles to improve the visibility of the bicycle and the rider to other road users in poor lighting.

Many jurisdictions require bicycle lights to be fitted to bicycles when ridden at night which generally require a front white light and a rear red light.

The present invention seeks to provide a bicycle light with improved conspicuity, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein a bicycle like device premised on the theory that human brains have enhanced cognitive awareness of motion.

As such, the present device encapsulates both direct visibility lighting and leg motion reflective lighting.

The lighting is respectively directed so that, when the device is attached to a bicycle in use, the leg motion reflective lighting casts illuminating light downwardly and forwardly onto legs of the rider with respect to a visible beam directed rearwardly by the direct visibility lighting.

Apart from the direct visibility lighting providing the requisite direct line of sight visibility, the illuminating light reflects visible light from the moving legs of the rider thereby enhancing cognitive awareness of motion in other road users.

The illuminating light may be specifically beamformed as is described herein for targeted illumination of the legs.

The device may further comprise a controller which may control the lighting independently according to lighting and road conditions.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 3:
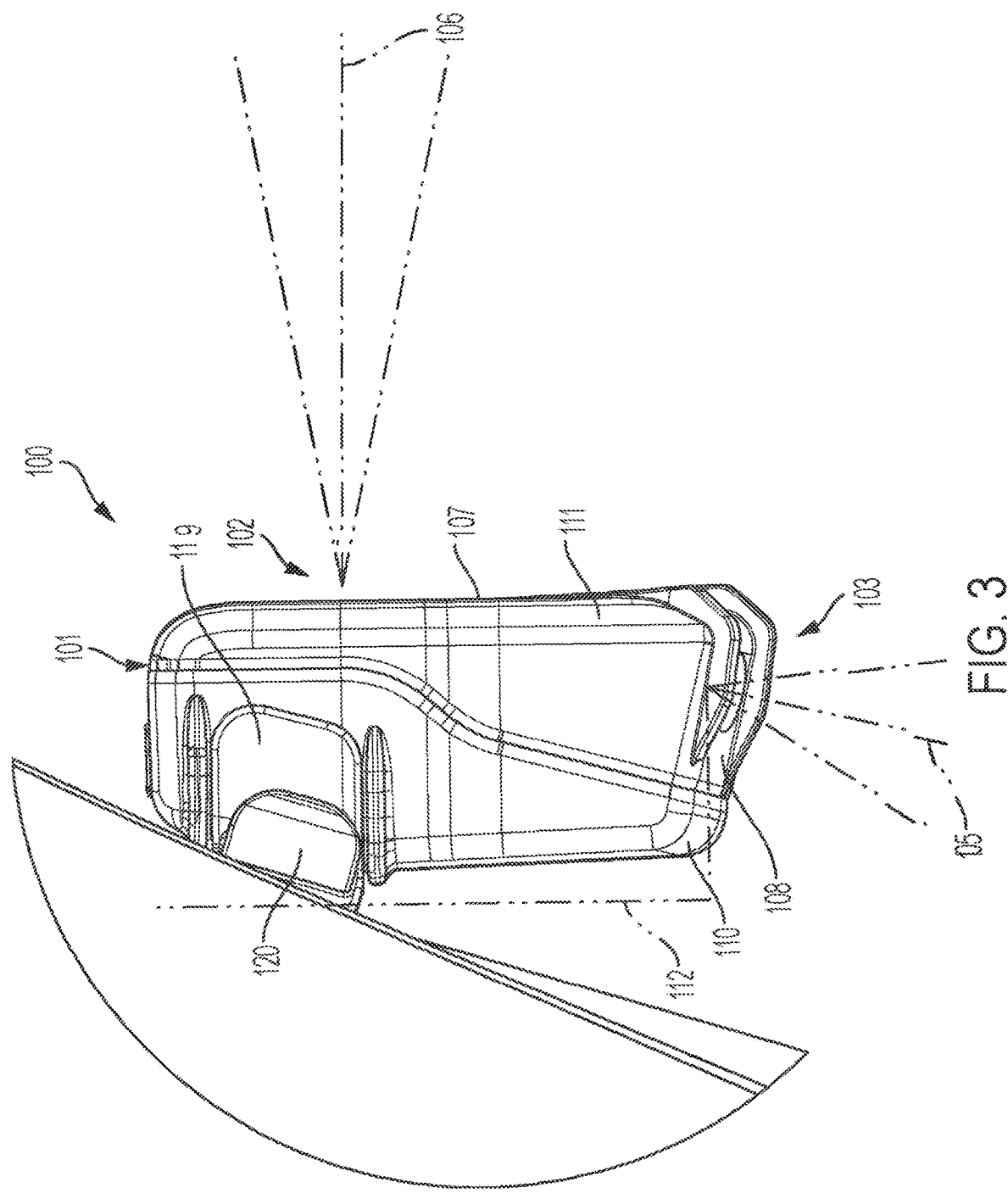
FIG. 3 shows a side view of the device.

FIG. 3 shows a bicycle light device 100 having a body 101 encapsulating direct visibility lighting 102 and leg motion reflective lighting 103.

The lighting 102, 103 is respectively directed so that, when the device 100 is attached to a bicycle 104 in use, the leg motion reflective lighting 103 casts illuminating light 105 downwardly and forwardly with respect to a visible beam 106 directed rearwardly by the direct visibility lighting 102.

As is further shown in FIG. 3, the illuminating light 105 may be angled forwardly with respect to a vertical axis 112. As can be seen, a downward component of the illuminating light 105 may be greater than a forward component of the illuminating light 105 and the centre of the visible beam 106 may be generally horizontal.

Figure 4:
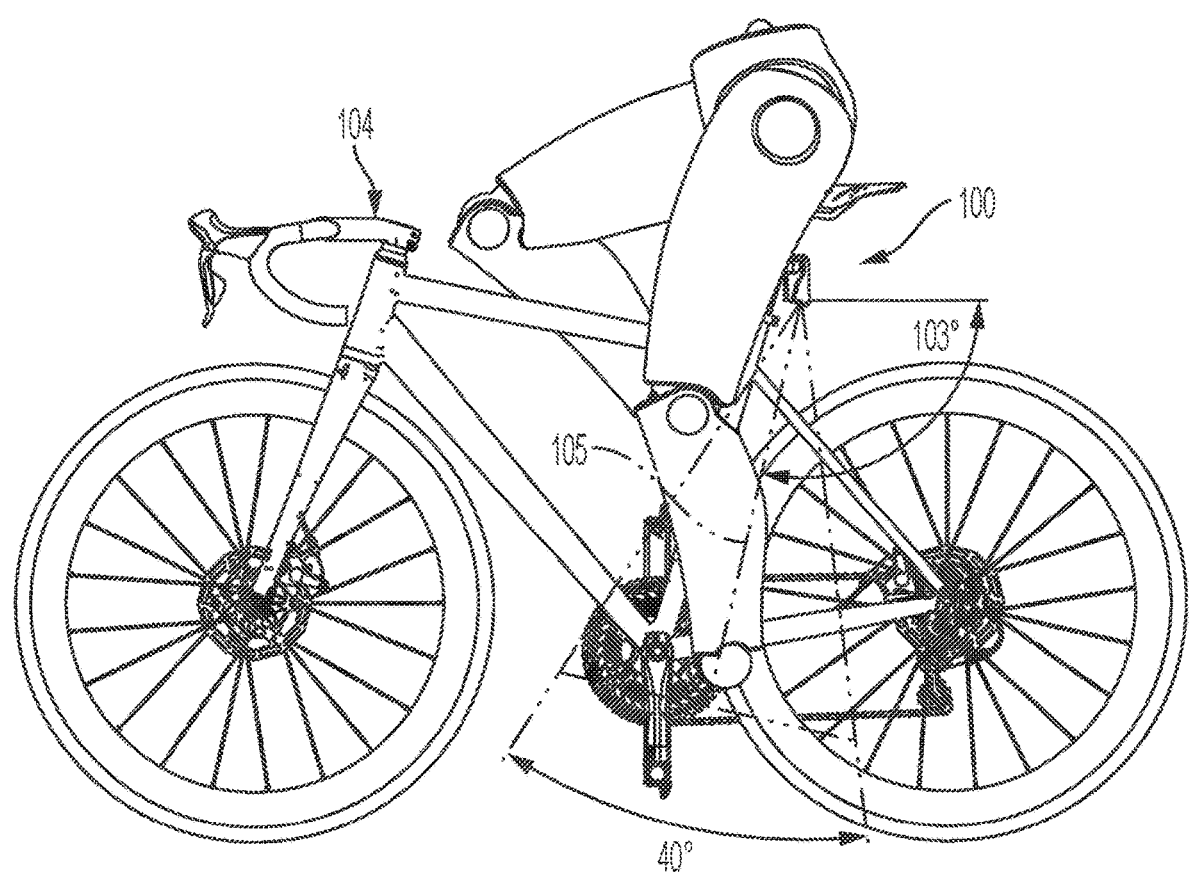
FIG. 4 illustrates front-to-rear beam angles of the device.

FIG. 4 shows that a beam angle between centres of the visible beam 106 and the illuminating light 105 may be more than 90°, such as approximately 103° as shown.

With reference to FIG. 3, the body 101 may comprise a rear surface 107 and an undersurface 108 angled less than 90° with respect to the rear surface 107 and wherein the visible beam 106 emanates from the rear surface 107 and the illuminating light 105 emanates from the undersurface 108. As such, the leg motion reflective lighting 103 may be visibly concealed from the rear under the undersurface 108.

The device 100 may comprise a lens 109 for a light (preferably a LED light) of the direct visibility lighting 102. The body 101 may comprise a nontransparent backing 110 and a transparent portion 111. The lens 109 may be integrally moulded in the transparent portion 111.

Figure 5:
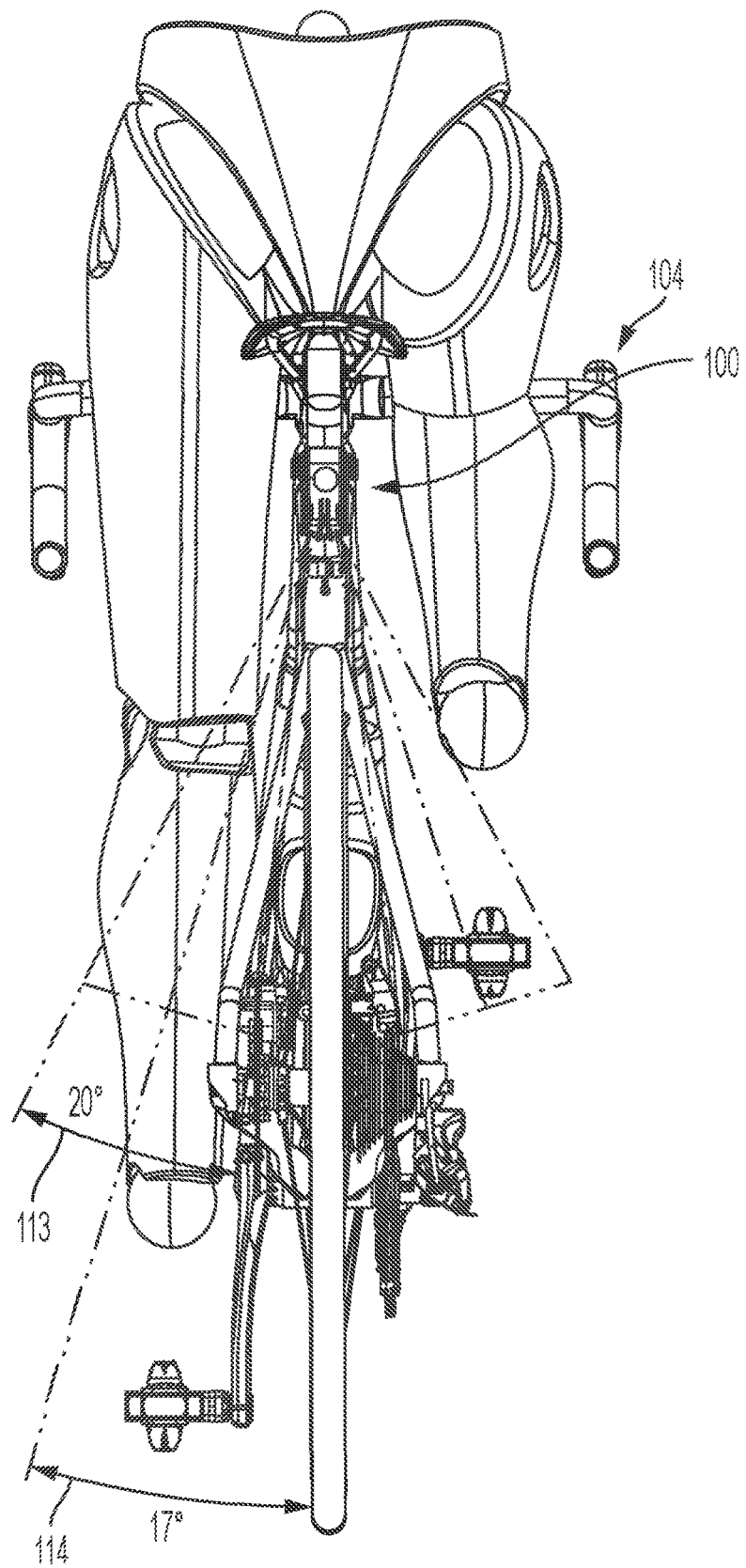
FIG. 5 illustrates a side beam angles of the device.

With reference to FIG. 5 the illuminating light 105 may be beamformed so as to diverge by between 17° and 20° either side.

The illuminating light 105 may be beamformed into a short throw wide beam 113 and a long throw narrow beam 114. The short throw wide beam 113 may diverge by approximately 20° either side and the long throw narrow beam 114 may diverge by approximately 17° either side to provide appropriate illumination at a bottom of a peddle stroke.

With reference to FIG. 4, the illuminating light 105 may be beam formed so as to diverge by approximately 40° front-to-rear.

Figure 6:
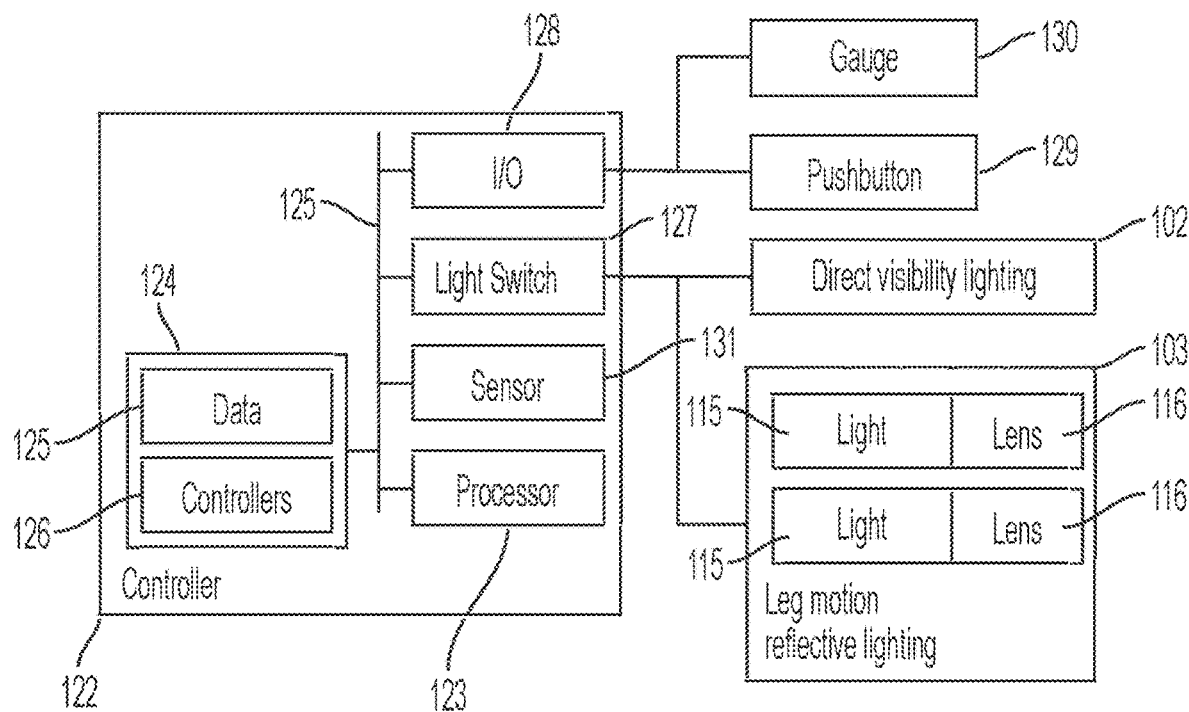
FIG. 6 shows a control schematic of the device.

With reference to FIG. 6, the leg motion reflective lighting 103 may comprise a pair of lights 115 (preferably a LED lights) which cast respective sideways angled beams of illuminating light 105.

Figure 2:
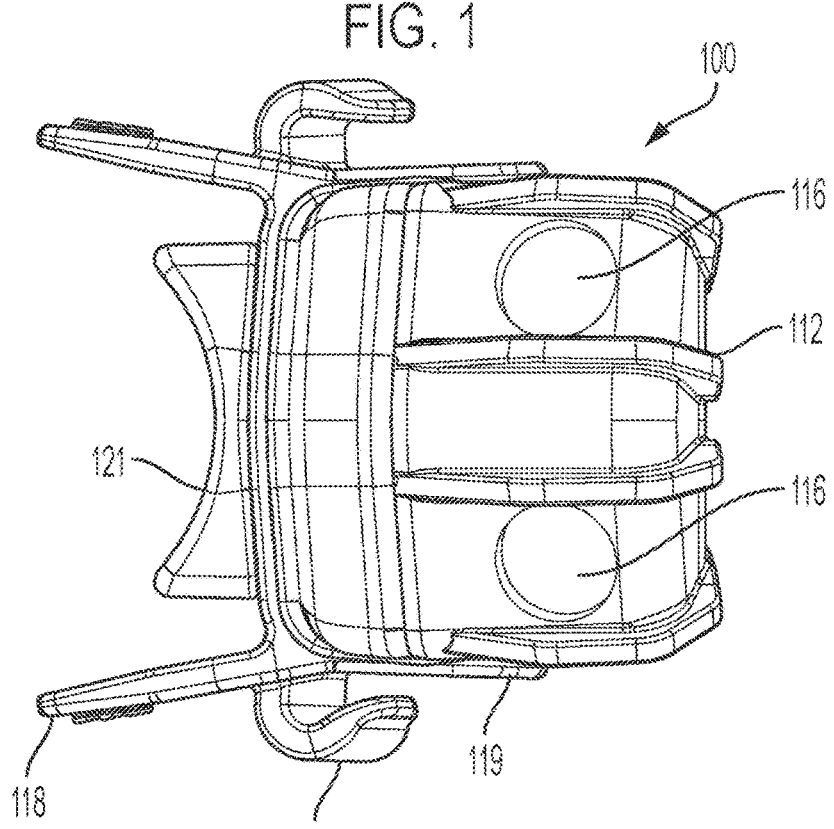
FIG. 2 shows an underside view of the device.

As shown in FIG. 2, respective lenses 116 may interface each light 115. The illuminating light 105 may be diffused through the lenses 116.

The lights 115 and or the lenses 114 may be angled with respect to each other so that the respective illumination light 105 diverges.

In embodiments, the device 100 may wirelessly interface with a crank cadence sensor so that each light 115 operates only on an upward rear pedal stroke.

Figure 1:
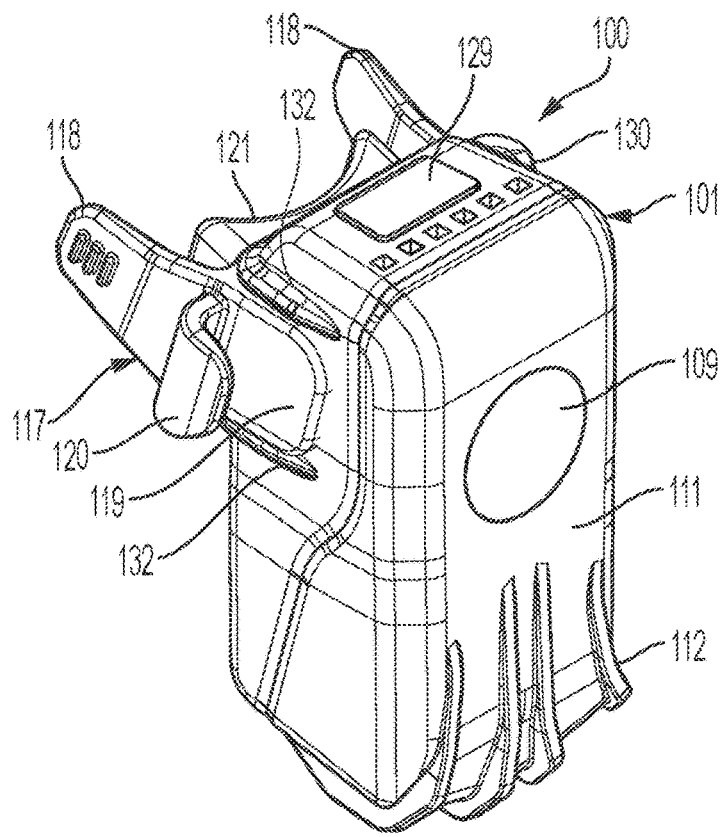
FIG. 1 shows a top perspective view of a bicycle like device in accordance with an embodiment.

With reference to FIG. 1, the transparent portion 111 may comprise a plurality of light guide rails 112 which guide light from the direct visibility lighting 102 or the leg motion reflective lighting 103 to enhance visibility of the device 100, including from the sides.

The guide rails 112 may go around from the rear surface 107 to the undersurface 108 and the leg motion reflective lighting 103 lenses 116 so that the rails 112 may be illuminated by both the direct visibility lighting 102 and the leg motion reflective lighting 103. The lenses 116 may locate between pairs of rails 112 as shown in FIG. 2.

With reference to FIG. 1, the device 100 may comprise a bicycle attachment clip 117 comprising a pair of elongate levers 118 which may be pinched together to prise open clip pieces 119 releasably engaging sides of the body 101. The clip pieces 119 may be guided between rails 132.

The clip 117 may comprise a pair of side elastic band hooks 120 and a rubberised seat post engaging pad 121 which may conform to various seat post cross-sectional profiles.

In embodiments, the device 100 may be rendered inoperative when clip 117 is disengaged. In this regard, the clip pieces 119 may operate a pushbutton switch concealed within the body 101 of the device.

With reference to FIG. 6, the device 100 may comprise a controller 122 for controlling the direct visibility lighting 102 and the leg motion reflective lighting 103.

The controller 122 may comprise a processor 123 for processing digital data. The controller 122 may further comprise a memory device 124 operably interfacing the processor 123 via a system bus 125.

The memory device 124 is configured for storing digital data including computer program code instructions and associated data 125. The computer program code instructions may be logically divided into a plurality of computer program code instruction controllers 126.

In use, the processor 123 fetches the computer program code instructions and associated data 125 from the memory device 124 for interpretation and execution of the control functionality described herein.

The controller 122 may take the form of a field-programmable gate array (FPGA) device.

The controller 122 may comprise a light switch 127 controlling the direct visibility lighting 122 and the leg motion reflective lighting 103. The light switch 127 may turn the lighting 102, 103 on and off.

Where the lighting 102, 103 comprises LEDs, the light switch 122 may control the intensity of the lighting 102, 103 using pulse width modulation.

The direct visibility lighting 102 and the leg motion reflective lighting 103 may comprise red lights.

However, in embodiments, the leg motion reflective lighting 103 may comprise different colour lights to that of the direct visibility lighting 102. For example, the leg motion reflective lighting 103 may comprise amber lights whereas the direct visibility lighting 102 comprises red lights.

In embodiments, the leg motion reflective lighting 103 comprises lights of different colour which may be independently operated, including via controller 122 operation. For example, in certain jurisdictions, the illumination light 105 may be required to be a colour other than red wherein the device 100 may be configured via a hardware jumper setting or programmatically during manufacture or by user initiation to operate the appropriately coloured lights for the leg motion reflective lighting 103.

The controller 122 may further comprise an I/O interface 128 which may interface a pushbutton 129 and a battery strength indicator gauge 130. With reference to FIG. 1, the gauge 130 may comprise a longitudinal array of discrete LEDs indicating battery strength therealong.

The controller 122 may be configured in various operational modes by repeated operation of the pushbutton 129, such as for turning the device 100 on or off and the cycling through various operational modes, including operational modes wherein the direct visibility lighting 122 and the leg motion reflective lighting 103 is operated independently, either in terms of operation, flashing pattern or intensity by the controller 122.

The controller 122 may comprise a sensor 131 so that the controller 120 can control the lighting 102, 103 according to sensor readings from the sensor 131.

In embodiments, the sensor 131 is a light sensor and wherein the controller 122 is configured to operate the lighting 102 and/or 103 when a light reading from the light sensor falls beneath a threshold.

Furthermore, the controller 122 may operate the lighting 102, 103 inversely proportional to ambient lighting. For example, in bright light, the controller 122 may increase the intensity of the lighting 102, 103 so as to be relatively conspicuous as opposed to darker conditions wherein less intensity is required.

In further embodiments, the sensor 131 is an accelerometer and wherein the controller is programmed to at least one of classify terrain and determine speed according to at least one of vibrational frequency and intensity detected by the accelerometer 131.

For example, the controller 122 may classify terrain as shared bicycle path terrain by detecting lower frequency and lower intensity as compared to road terrain having higher frequency and intensity.

As such, for example, the controller 122 may dim the direct visibility lighting 102 when detecting the shared bicycles path terrain so as to not blind fellow riders.

Further for example, the controller 122 may only operate the leg motion reflective lighting 103 when detecting road terrain.

In embodiments, the controller 122 may increase intensity of the lighting 102 or 103 proportional speed.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The term "approximately" or similar as used herein should be construed as being within 10% of the value stated unless otherwise indicated.

The invention claimed is:

1. A bicycle light device having a body including a rear surface and an undersurface, the body encapsulating direct visibility lighting and leg motion reflective lighting, the leg motion reflective lighting respectively directed so that, when the device is attached to a bicycle, the leg motion reflective lighting casts illuminating light downwardly and forwardly with respect to a visible beam directed rearwardly by the direct visibility lighting to reflect light from rider legs to enhance leg motion cognitive awareness, wherein the visible beam emanates from the rear surface and the illuminating light emanates from the undersurface.

2. The device as claimed in claim 1, wherein a downward component of the illuminating light is greater than a forward component of the illuminating light.

3. The device as claimed in claim 1, wherein a beam angle between centres of the visible beam and the illuminating light is greater than 90°.

4. The device as claimed in claim 3, wherein the beam angle is approximately 103°.

5. The device as claimed in claim 3, wherein the undersurface is angled less than 90° to the rear surface.

6. The device as claimed in claim 1, wherein the illuminating light is beamformed.

7. The device as claimed in claim 6, wherein an illuminating light beam diverges by between approximately 17° and 20° either side.

8. The device as claimed in claim 6, wherein the illuminating light is beamformed into a short throw wide beam and a long throw narrow beam.

9. The device as claimed in claim 8, wherein the short throw wide beam diverges by approximately 20° either side.

10. The device as claimed in claim 8, wherein the long throw narrow beam diverges by approximately 17° either side.

11. The device as claimed in claim 6, wherein an illuminating light beam diverges by approximately 40° front-to-rear.

12. The device as claimed in claim 1, wherein the leg motion reflective lighting comprises a pair of lights casting respective sideways angled illuminating light.

13. The device as claimed in claim 1, wherein the illuminating light is diffused.

14. The device as claimed in claim 1, wherein the body comprises a transparent cover comprising a plurality of light guide rails and wherein light from at least one of the direct visibility lighting and the leg motion reflective lighting illuminates the rails.

15. The device as claimed in claim 1, wherein the device comprises a controller configured to control the direct visibility lighting and the leg motion reflective lighting independently.

16. The device as claimed in claim 1, wherein the device comprises a controller and a sensor operably coupled to the controller and wherein the controller controls the direct visibility lighting and the leg motion reflective lighting independently according to readings from the sensor.

17. The device as claimed in claim 16, wherein the sensor is a light sensor and wherein the controller is programmed to operate the leg motion reflective lighting when a light reading from the light sensor falls beneath a threshold.

18. The device as claimed in claim 16, wherein the sensor is a light sensor and wherein the controller is programmed to control an intensity of the leg motion reflective lighting inversely proportional to the light reading.

19. The device as claimed in claim 16, wherein the sensor is an accelerometer and wherein the controller is programmed to at least one of classify terrain and determine speed according to at least one of vibrational frequency and intensity detected by the accelerometer.

20. The device as claimed in claim 19, wherein the controller is configured for controlling the operation of the leg motion reflective lighting depending on a terrain classification.

* * * * *